Sept. 24, 1968
J. R. MAHONEY
3,402,949
STEPPED CONNECTOR BODY
Filed June 6, 1966
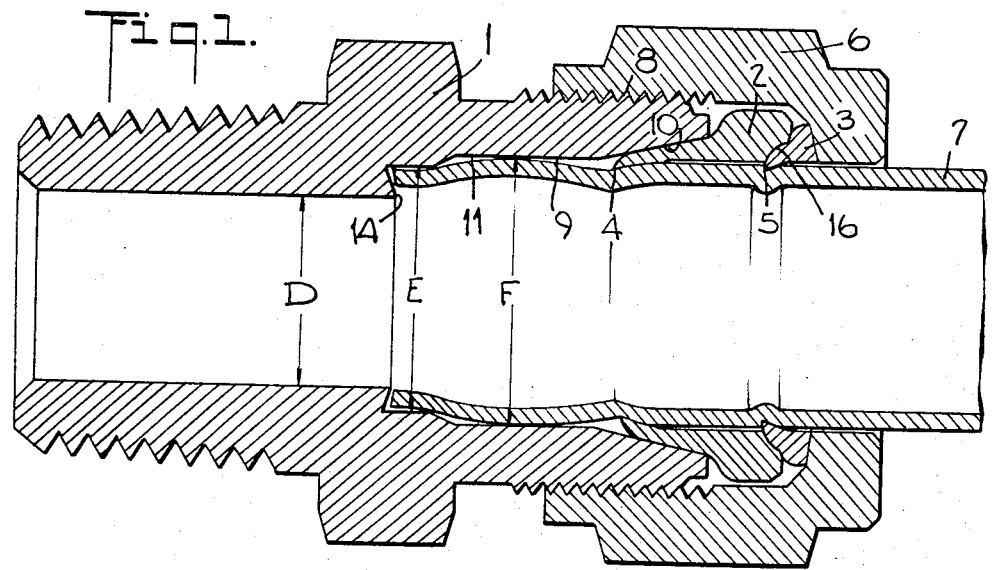
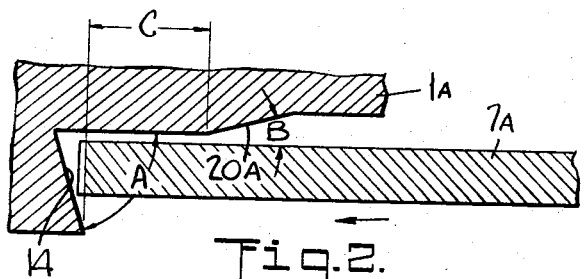
Fig.2.
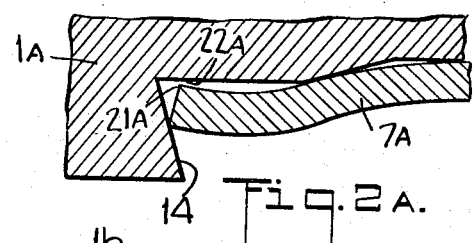
Fig.2A.
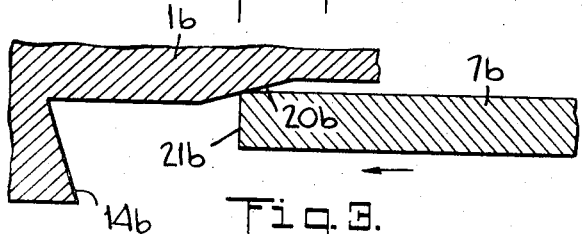
Fig.3.
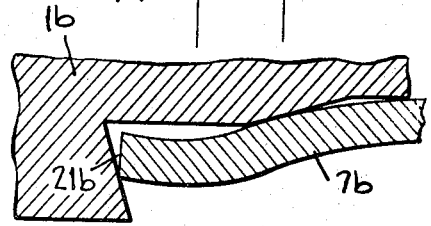
Fig.3A.
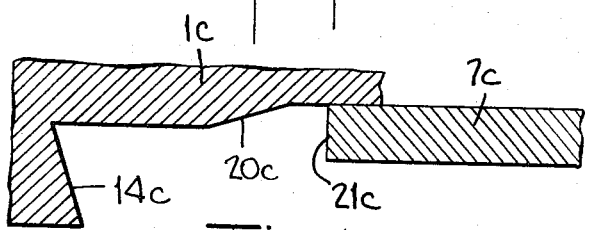
Fig.4.
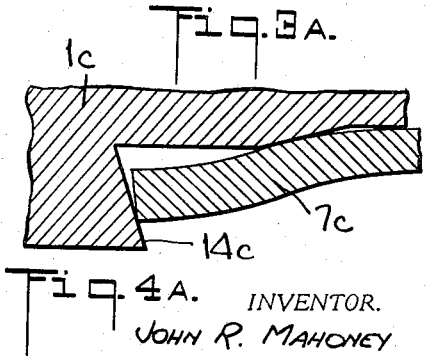
Fig.4A.
INVENTOR.
JOHN R. MAHONEY
BY
Norman N Holland
ATTORNEY United States Patent Office 3,402,949
Patented Sept. 24, 1968

3,402,949
STEPPED CONNECTOR BODY
John R. Mahoney, Norwood, N.J., assignor to Hoke Manufacturing Company, Inc., Cresskill, N.J., a corporation of New Jersey
Filed June 6, 1966, Ser. No. 555,376
5 Claims. (Cl. 285—341)

ABSTRACT OF THE DISCLOSURE

An improvement in tube couplings for the purpose of facilitating reuse of the coupled tube in subsequent connections using a similar connector. The coupling is of the type wherein a tube is received into a body portion and is attached thereto with the addition of one or more ring-like ferrules which are wedged between the tube and the body by a coupling nut. The improvement is in the shape of the tube receiving bore in the body. This bore is made having two adjacent sections of differing diameters connected together by a slanted or flared step. This shaping of the bore causes the tube when initially attached to the body to have a bulged and consequently inwardly flared end whose reduced end diameter will easily fit into other bodies regardless of small dimensional variations in the body size.

---

The present invention relates to compression pipe couplings and more particularly to an improved body member or tube receiving seat for use in such a coupling.

Compression tube couplings are used to attach tubes or pipes to a body member without the formation of threads in the coupled tube itself. The body member, for example, may be a tube receiving seat in a valve or a gauge or a pipe element such as a T or other pipe element. Couplings of this sort, as for example the coupling illustrated in Patent No. 3,215,457 owned by the assignee of the present invention, provide for a fluid tight connection between a tube and a body using one or more ring-like ferrules which draw the tube against the seat and seal it against the body under the control of a theraded coupling nut. Such couplings are particularly advantageous for thin walled drawn tubing such as brass or copper or stainless steel tubing as they permit effective and extremely strong or fluid tight couplings to be made rapidly between such tubes and various body members by the simple application of the ferrules and the nut and thus without requiring the formation of threads and the use of thread sealing compounds in forming the connection.

With tubes of this type, however, a problem is presented by the wide range of pipe or tube diameter tolerances encountered. These relatively wide variations in tube size tolerance taken with the expected and permissible tolerance ranges in the receiving bores in the body members to which the tubes are coupled present problems both in the initial sealing and more significantly in the resealing or replacement operations where it is desired in a completed system to replace one coupled element or body member with another. Specifically trouble is encountered when a tube which has been previously applied by a compression coupling is deformed to the extent that it will not thereafter fit into or seal a subsequent body member.

The present invention provides a novel body shape and a related coupling method which assures that tubes within the entire expected tolerance range will be initially connected and sealed to a first body having any receiving bore within the normal bore tolerance range and will thereafter be again sealed and coupled to a second member having a differing bore within the bore tolerance range. This improved result is obtained by a novel step element provided in the seating bore preferably in combination with a flared tube seat shoulder as will be more fully described below.

Accordingly, an object of the present invention is to provide an improved compression-type tube coupling.

Another object of the present invention is to provide an improved compression-type tube coupling useful for successively coupling bodies having differing seat bore diameters.

Another object of the present invention is to provide an improved body shape for the body portion of an element in a threadless compression tube coupling.

Another object of the present invention is to provide an improved means and method for coupling and recoupling a tube using a threadless compression coupling.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical sectional view of a completed coupling having a stepped body in accordance with the present invention; and FIGS. 2–4A are enlarged detailed sectional views illustrating the coupling action of a stepped body in accordance with the present invention for tubes and bodies having differing relative diameters.

The improved body 1 in accordance with the present invention will be described as used with a compression-type coupling having two cooperating ring-like ferrules 2 and 3 which simultaneously physically couple the tube to the body while forming a fluid tight seal with the body. Such a coupling, for example, is illustrated in the above noted patent.

This threadless coupling has the ring-like ferrules 2 and 3 as illustrated in FIG. 1 whose inner surfaces and front edges 4 and 5 in particular are forced inwardly against the tube 7 under the force of the threaded coupling nut 6 as the nut 6 is turned onto suitable threads 8 on the body 1. For convenience, a threaded nipple is illustrated as the body portion in the following description, however, it is to be understood that the nipple is merely illustrative and a tube receiving bore in accordance with the invention may be provided on various elements such as valves and gauges, etc.

The tube receiving bore 9 in the body 1 includes an outer flared portion 10 terminating in a cylindrical inner bore 11 whose detailed shape in accordance with the present invention will be described further below. The above described ferrules include the inner ferrule 2 with a flared outer surface 12 which engages with the flared surface 10 of the bore 9 to force the inner edge 4 of this ferrule inwardly as the nut 6 is applied resulting in a corresponding inward movement in the tube 7 tightly against the bore shoulder 14 and a subsequent further controlled penetration of the ferrule edge 4 into the tube 7 to provide a combined mechanical and fluid seal between the tube 7 and the body 1. The second or rear ferrule 3 illustrated in FIG. 1 has a concave outer surface 15 engaging a complimentary concave surface 16 at the rear of the front ferrule 2 which provides for a further sealing action of the combination as the rear ferrule 3 rolls or gyrates inwardly against the tube 7 in the general manner illustrated in FIG. 1.

The above described ferrules and nut are typical of those useful with the improved body of the present invention, however, it is clear that other types of ferrules which act to force the tube 7 inwardly and which provide a mechanical and fluid seal are equally useful with an improved tube receiving body in accordance with the present invention.

The various tubes attached to the fittings by such compression couplings are most often formed by an extrusion process but regardless of their manner of formation these tubes have a relatively wide diameter tolerance range. The larger tubes may just barely fit into the internal bore of the corresponding fitting tube seat particularly where the fitting itself has an inner diameter at the minimum end of the bore tolerance range. Where such a fitting and tube are matched in the initial coupling even the slightest outward flare of the tube end resulting from the application of the ferrules and the nut may prevent the subsequent reassembly of the tube as the flared tube may have an outer diameter larger than that of the subsequent tube receiving bore in the body to which it may be necessary that it be attached.

A novel step design of the present invention prevents this subsequent misfit of the tube and body by forming an inward taper on the tube end during the initial coupling. The formation and action of the step will now be described in greater detail with particular reference to the enlarged and detailed FIGS. 2 thru 4A which show the operation of the step for various relative diameters of the tube 7 and body 1. FIGS. 2 and 2A illustrate the conditions which exists for a relative small tube and a large seat. This condition may result for tubes having diameters at the small end of the tolerance range or for average tubes being fitted into a body having a bore of maximum diameter. FIG. 2 shows the tube 7a being inserted into the body 1a with the tube inner end adjacent to but passing under the step 20a. FIG. 2A illustrates the tube 7a fully seated with the tube end engaging the flared seat shoulder 14. The flare of the shoulder 14 forces or holds the end of the tube 7a outwardly as the tube also bulges toward the bore 9. The step 20a limits the outward flare of the tube end on the shoulder 14 and also prevents the tube bulging from occurring at the end. The tube 7a will now enter a subsequent body even though the body may have a tube receiving bore diameter at the smaller end of the tolerance range. As in FIG. 2A, there is sufficient clearance between the tube end 21a and the inner surface of the bore 22a to permit reassembly even for smaller body bores.

FIG. 3 illustrates an intermediate relationship which may be encountered with a median tolerance for both the tube 7b and body 1b or where both the tube and the body are both large or are both small. In this condition the end 21b of the tube engages the inclined step 20b. As the end 21b passes along the step 20b it is necessarily forced inwardly as the tube 7b moves to the final position as illustrated in FIG. 2A. It will be seen that a relatively short surface only of the step 20b engages the tube surface so that a tapering action is provided without a substantial resistance being generated against the full seating action of the tube 7b as the ferrules and nut move the tube to its final position. This facilitates the application of the coupling and also insures that the tube 7b will move completely into its finally seated position, as ilustrated in FIG. 3A, to assure a tight coupling while at the same time achieving the desired taper to facilitate reassembly in the manner described above.

FIG. 4 illustrates another relative position which may be encountered in coupling a tube to a body having a minimum bore. In this case, as seen in FIGS. 4 and 4A the tube 7c moves into sliding engagement with almost the entire surface of the step 20c. Even in this case, however, the relatively short step 20c engages a minimal annular area along the tube 7c as the tube end 21c is forced inwardly and formed with a constricted tube end and as the tube end 21c moves into abutting engagement with the flared tube seat shoulder 14c. Even with this relative diameter relation, it is clear that the step 20c functions to provide for a full seating of the tube 7c and a simultaneous constricting of the tube end to facilitate reassembly of the same tube with another body or fitting having a similar or differing seat diameter within the expected seat diameter tolerance range.

The above description of the step spaced outwardly of the shoulder and operating as indicated to constrict the tube end clearly indicates the method and means for obtaining an improved coupling. The spacing of the step outwardly of the shoulder as indicated by the dimension C in FIG. 2 provides a significant feature of the improvement. As the dimension C is reduced to zero the advantage of an early engagement between the tube end and the step is lost with a corresponding loss of assurance that the tapering action has actually been performed and in addition the tapering is limited to an unsatisfactorily short portion of the tube end resulting in both a constriction inadequate in amount and formed with greater difficulty. Representative angles A and B for the shoulder and step as indicated in FIG. 2 as well as the diameters of the sections of the tube bore in the stepped body for several fitting sizes are indicated below. These dimensions and angles are not considered to be limiting and are quoted for illustrative purposes only as it is believed that the above general discussion gives a complete and clear description of the improved stepped body design.

REPRESENTATIVE DIMENSIONS

| Fitting Size | Shoulder Angle A, ±3° | Step Angle B, ±2° | Length C, +.05 | Fitting Diameter D, ±.005 | Step Diameter E, +.003 | Bore Diameter F, +.003 | Nominal Tube Diameter |
|---|---|---|---|---|---|---|---|
| 2 | 75 | 15 | .040 | .093 | .126 | .131 | 1/8 |
| 4 | 75 | 15 | .050 | .187 | .251 | .256 | 1/4 |
| 8 | 75 | 15 | .135 | .422 | .503 | .507 | 1/2 |
| 14 | 75 | 15 | .150 | .719 | .878 | .882 | 7/8 |

It will be seen that a substantial improvement has been provided for compression-type couplings which extends the usefulness of these couplings and permits ready assembly and reassembly of fluid systems employing such couplings. The improved results are obtained by a significant but relatively easily made change in the shape of the tube receiving seat or bore. This change may be usefully employed with a variety of couplings where tubes are forced into bores during the formation of the couplings using suitable ferrules or other coupling members.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a compression tube coupling having a body with a tube receiving bore and with the bore having a flared outer end portion and the coupling including a tapered ferrule and a ferrule engaging nut for moving the tube into the bore and forcing the end of the tube in place against a shoulder portion at the inner end of said bore with the ferrule wedged between said flared portion and the tube the improvement which comprises said body bore having a cylindrical enlarged diameter portion inwardly of the flared end and being engaged with an outwardly bulged portion of the tube, said enlarged diameter bore portion being connected with a cylindrical lesser diameter bore portion by a flared annular step, the inner end of said lesser diameter portion terminating in said bore shoulder portion, and said tube having an inwardly flared portion spaced from the tube end and engaging said flared step.

2. The coupling as claimed in claim 1 in which the shoulder forms an acute angle with said lesser diameter cylindrical portion of the tube receiving bore.

3. The coupling as claimed in claim 1 in which said shoulder forms an angle of about 72 to 78° with said lesser diameter cylindrical portion of the tube receiving bore.

4. The coupling as claimed in claim 1 in which said step portion is straight in cross-section and forms about a 15 to 17° angle with said cylindrical portions.

5. The tube coupling as claimed in claim 1 in which the enlarged diameter portion of the bore has a diameter larger than the greatest nominal tube diameter for that coupling, and the lesser diameter portion of the bore has a diameter larger than the smallest nominal tube diameter and smaller than the greatest nominal tube diameter.

References Cited

UNITED STATES PATENTS 3,069,188   12/1962   Crawford _____ 285—342

CARL W. TOMLIN, *Primary Examiner.*

W. L. SHEDD, *Assistant Examiner.*